United States Patent
Shipp

(10) Patent No.: US 7,404,209 B2
(45) Date of Patent: Jul. 22, 2008

(54) METHOD OF, AND SYSTEM FOR, SCANNING ELECTRONIC DOCUMENTS WHICH CONTAIN LINKS TO EXTERNAL OBJECTS

(75) Inventor: Alexander Shipp, Barnwood (GB)

(73) Assignee: Messagelabs Limited, Gloucester (GB)

( * ) Notice: Subject to any disclaimer, the term of this patent is extended or adjusted under 35 U.S.C. 154(b) by 718 days.

(21) Appl. No.: 10/500,959

(22) PCT Filed: Aug. 11, 2003

(86) PCT No.: PCT/GB03/03475

§ 371 (c)(1),
(2), (4) Date: Sep. 3, 2004

(87) PCT Pub. No.: WO2004/017238

PCT Pub. Date: Feb. 26, 2004

(65) Prior Publication Data

US 2005/0055569 A1 Mar. 10, 2005

(30) Foreign Application Priority Data

Aug. 14, 2002 (GB) ................. 0218990.0

(51) Int. Cl.
*G06F 11/00* (2006.01)
*G06F 17/30* (2006.01)
(52) U.S. Cl. ................. 726/22; 726/25; 726/3
(58) Field of Classification Search ........... 726/22, 726/26, 23, 25, 3
See application file for complete search history.

(56) References Cited

U.S. PATENT DOCUMENTS

| 5,781,901 A | 7/1998 | Kuzma |
| 6,298,444 B1 | 10/2001 | Foss et al. |
| 6,321,242 B1 | 11/2001 | Fogg et al. |
| 6,629,138 B1 | 9/2003 | Lambert et al. |
| 6,701,440 B1 | 3/2004 | Kim et al. |
| 2003/0097591 A1 | 5/2003 | Pham et al. |
| 2004/0073631 A1 | 4/2004 | Keorkunian et al. |
| 2004/0088570 A1 | 5/2004 | Roberts et al. |
| 2004/0117450 A1 | 6/2004 | Campbell et al. |
| 2004/0177042 A1 | 9/2004 | Fostick |
| 2004/0243844 A1 | 12/2004 | Adkins |

(Continued)

FOREIGN PATENT DOCUMENTS

EP 1 058 199 12/2000

(Continued)

OTHER PUBLICATIONS

Multivalent documents: inducing structure and behaviors in online digital documents Phelps, T.A.; Wilensky, R.; System Sciences, 1996., Proceedings of the Twenty-Ninth Hawaii International Conference on, vol. 5, Jan. 3-6, 1996 pp. 144-152 vol. 5.*

(Continued)

*Primary Examiner*—David Jung
(74) *Attorney, Agent, or Firm*—Nixon & Vanderhye, PC

(57) ABSTRACT

A content scanner for electronic documents such as email scans objects which are the target of hyperlinks within the document. If they are determined to be acceptable, a copy of the object is attached to the document and the link is replaced by one pointing to the copied object.

16 Claims, 2 Drawing Sheets

U.S. PATENT DOCUMENTS

| | | |
|---|---|---|
| 2005/0055569 A1 | 3/2005 | Shipp |
| 2005/0071748 A1 | 3/2005 | Shipp |
| 2005/0086499 A1 | 4/2005 | Hoefelmeyer et al. |
| 2005/0256955 A1 | 11/2005 | Bodwell et al. |

FOREIGN PATENT DOCUMENTS

| | | |
|---|---|---|
| EP | 1 058 199 A2 | 12/2000 |
| GB | 2 356 474 A | 5/2001 |
| WO | 00/65483 | 11/2000 |
| WO | 00/65483 A | 11/2000 |
| WO | WO-0065483 A2 * | 11/2000 |
| WO | 01/33380 A1 | 5/2001 |
| WO | 2004/017238 | 2/2004 |
| WO | 2004/097676 | 11/2004 |

OTHER PUBLICATIONS

Hyperdocument generation using OCR and icon detection Worring, M.; van den Boomgaard, R.; Smeulders, A.W.M.; Document Analysis and Recognition, 1995., Proceedings of the Third International Conference on vol. 2, Aug. 14-16, 1995 pp. 1180-1183 vol. 2.*

Extracting anchorable information units from PDF files Chakraborty, A.; Liu, P.; Hsu, L.; Multimedia and Expo, 2003. ICME '03. Proceedings. 2003 International Conference on vol. 1, Jul. 6-9, 2003 pp. I—173-6 vol. 1.*

Wiegel B Ed; Association for Computing Machinery: "Secure External References in Mutimedia Email Messages"; $3_{rd}$ ACM Conf. on Computers and Communications Security, New Dehli, Mar. 14-16, 1996; ACM Conf. on Computers and Communications Security, New York, ACM, US, vol. Conf. 3 Mar. 14, 1996, pp. 11-18; XP000620973; ISBN: 0-89791-829-0; abstract pp. 1-4.

Greenfield P. et al.; "Access Prevention techniques for Internet Content Filtering"; CSIRIO, Dec. 1999; XP002265027; pp. 7-14, pp. 17-33.

"Look Ahead Filtering of Internet Content" IBM Technical Disclosure Bulleting, IBM Corp., New York, US; vol. 40, No. 12; Dec. 1, 1997, pp. 143; XP000754118; ISSN: 0018-8689.

"Look Ahead Filtering of Internet Content"; IBM Technical Disclosure Bulletin, IBM Corp. New York, US, vol. 40, No. 12, Dec. 1, 1997, p. 143, XP000754118.

Montebello et al; "Evolvable Intelligent User Interface for WWW Knowledge-Based Systems"; Database Engineering and Applications Symposium, 1998, Proceedings, IDEAS'98 International Cardiff, UK Jul. 8-10, 1998, Los Alamitos, CA, USA, IEEE Comput, Soc, US, Jul. 8, 1998, pp. 224-233, XP010294640.

* cited by examiner

METHOD OF, AND SYSTEM FOR, SCANNING ELECTRONIC DOCUMENTS WHICH CONTAIN LINKS TO EXTERNAL OBJECTS

This application is the US national phase of international application PCT/GB03/03475, filed 11 Aug. 2003, which designated the US and claims priority to GB Application No. 0218990.0, filed 14 Aug. 2002. The entire contents of these applications are incorporated herein by reference.

The present invention relates to a method of, and system for, replacing external links in electronic documents such as email with internal links. One use of this is to ensure that email that attempts to bypass email content scanners no longer succeeds. Another use is to reduce the effectiveness of web bugs.

BACKGROUND

Content scanning can be carried out at a number of places in the passage of electronic documents from one system to another. Taking email as an example, it may be carried out by software operated by the user, e.g. incorporated in or an adjunct to, his email client, and it may be carried out on a mail server to which the user connects, over a LAN or WAN, in order to retrieve email. Also, Internet Service Providers (ISPs) can carry out content scanning as a value-added service on behalf of customers who, for example, then retrieve their content-scanned email via a POP3 account or similar.

One trick which can be used to bypass email content scanners is to create an email which just contains a link (such as an HTML hyperlink) to the undesirable or "nasty" content. Such content may include viruses and other varieties of malware as well potentially offensive material such as pornographic images and text, spam and other material to which the email recipient may not wish to be subjected. The content scanner sees only the link, which is not suspicious, and the email is let through. However, when viewed in the email client, the object referred to may either be bought in automatically by the email client, or when the reader clicks on the link. Thus, the nasty object ends up on the user's desktop, without ever passing through the email content scanner.

It is possible for the content scanner to download the object by following the link itself. It can then scan the object. However, this method is not foolproof—for instance, the server delivering the object to the content scanner may be able to detect that the request is from a content scanner and not from the end user. It may then serve up a different, innocent object to be scanned. However, when the end-user requests the object, they get the nasty one.

SUMMARY OF THE INVENTION

The present invention seeks to reduce or eliminate the problems of embedded links in electronic documents and does so by having the content scanner attempt to follow a link found in an electronic document and scan the object which is the target of the link. If the object is found to be acceptable from the point of view of content-scanning criteria, it is retrieved by the scanner and embedded in the electronic document and the link in the electronic document is adjusted to point at the embedded object rather than the original; this can then be delivered to the recipient without the possibility that the version received by the recipient differs from the one originally scanned.

If the object is not found to be acceptable, one or more remedial actions may be taken: for example, the link may be replaced by a non-functional link and/or a notice that the original link has been removed and why; another possibility is that the electronic document can be quarantined and an email or alert generated and sent to the intended recipient advising him that this has been done and perhaps including a link via which he can retrieve it nevertheless or delete it. The process of following links, scanning the linked object and replacing it or not with an embedded copy and an adjusted link may be applied recursively. An upper limit may be placed on the number of recursion levels, to stop the system getting stuck in an infinite loop (e.g. because there are circular links) and to effectively limit the amount of time the processing will take.

Thus according to the present invention there is provided a content scanning system for electronic documents such as emails comprising:

a) a link analyser for identifying hyperlinks in document content;

b) means for causing a content scanner to scan objects referenced by links identified by the link analyser and to determine their acceptability according to predefined rules, the means being operative, when the link is to an object external to the document and is determined by the content analyser to be acceptable, to retrieve the external object and modify the document by b1. embedding in it or attaching to it the retrieved copy of the object; and b2. replacing the link to the external object by one to the copy embedded in, or attached to, the document.

The invention also provides a method of content-scanning electronic documents such as emails comprising:

a) using a link analyser for identifying hyperlinks in document content;

b) using a content scanner to scan objects referenced by links identified by the link analyser and to determine their acceptability according to predefined rules, the means being operative, when the link is to an object external to the document and is determined by the content analyser to be acceptable, to retrieve the external object and modify the document by b1. embedding in it or attaching to it the retrieved copy of the object; and b2. replacing the link to the external object by one to the copy embedded in, or attached to, the document.

Thus the content scanner can follow the link, and download and scan the object. If the object is judged satisfactory, the object can then be embedded in the email, and the link to the external object replaced by a link to the object now embedded in the email.

One trick used by spammers is to embody 'web bugs' in their spam emails. These are unique or semi-unique links to web sites—so a spammer sending out 1000 emails would use 1000 different links. When the email is read, a connection is made to the web site, and by finding which link has been hit, the spammer can match it with their records to tell which person has read the spam email. This then confirms that the email address is a genuine one. The spammer can continue to send email to that address, or perhaps even sell the address on to other spammers.

By following every external link in every email that passes through the content scanner, all the web bugs the spammer sends out will be activated. Their effectiveness therefore becomes much reduced, because they can no longer be used to tell which email addresses were valid or not.

BRIEF DESCRIPTION OF THE DRAWINGS

The invention will be further described by way of non-limiting example with reference to the accompanying drawings, in which.

DETAILED DESCRIPTION OF EXAMPLE EMBODIMENTS

Figure 1A:
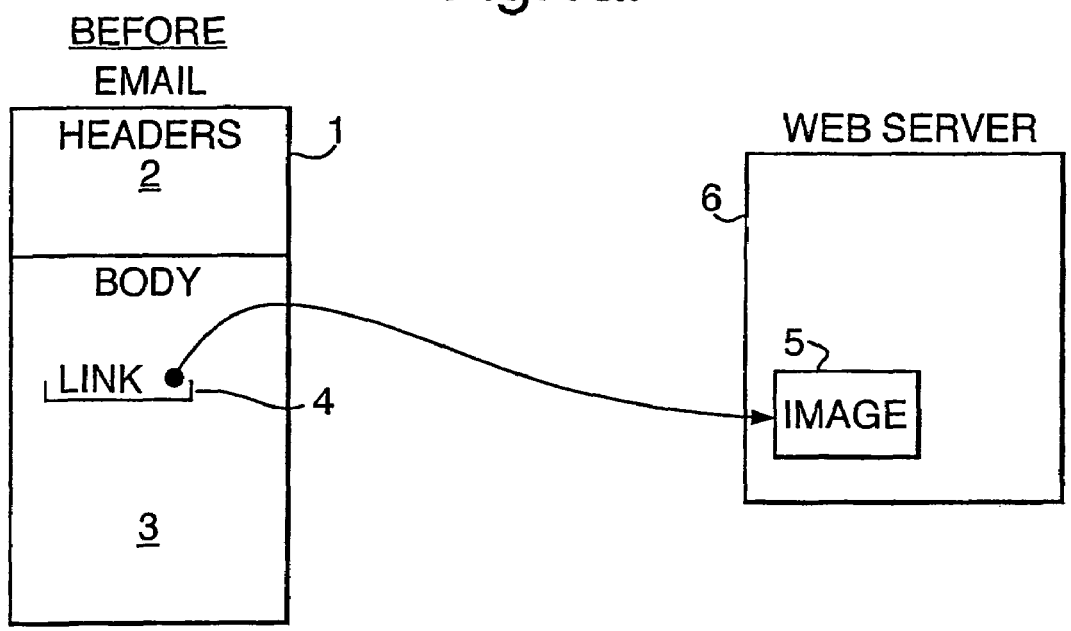
FIG. 1 shows the "before" and "after" states of an email processed by an embodiment of the present invention.
Figure 1B:
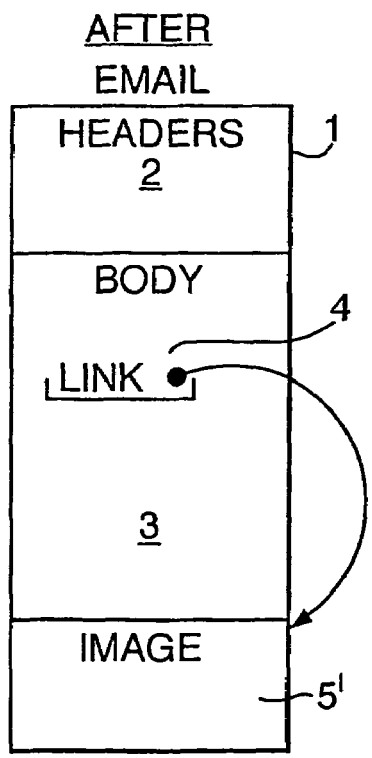
Figure 2:
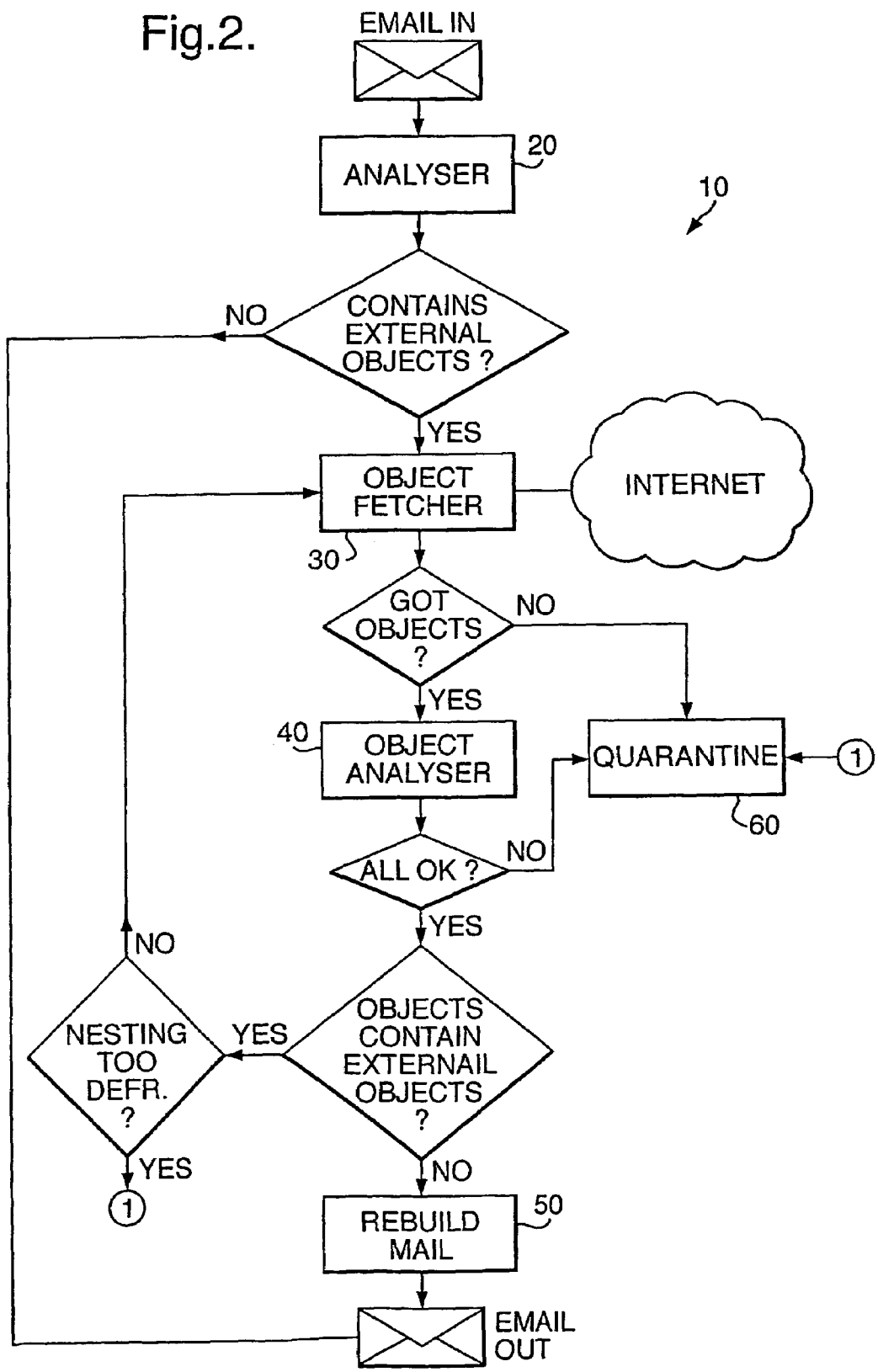
FIG. 2 shows a system embodying the present invention.

FIG. 1a shows an email 1 which comprises a header region 2 and a body 3 formatted according to an internet (e.g. SMTP/MIME) format. The body 3 includes a hypertext link 4 which points to an object 5 on a web server 6 somewhere on the internet. The object 5 may for example be a graphical image embedded in a web page (e.g. HTML or XHTML);

FIG. 1b shows the email 1 after processing by the illustrated embodiment of the invention and it will be seen that the object 5 has been appended to the email (e.g. as a MIME attachment) as item 5' and the link 4 has been adjusted so that it now points to this version of the object rather than the one held on the external server 6; and FIG. 2 is an illustration of a system 10, according to the present invention which may be implemented as a software automaton. Although the invention is not limited to this application, this example embodiment is given in terms of a content scanner operated by an ISP to process an email stream e.g. passing through an email gateway.

Operation of Embodiment

1) The email is analysed by analyser 20 to determine whether it contains external links. If none are found, omit steps 2 to 5.

2) For each external link, the external object is obtained by object fetcher 30 from the internet. If the object cannot be obtained, go to step 7.

3) The external objects are scanned by analyser 40 for pornography, viruses, spam and other undesirables. If any are found, go to step 7.

4) The external objects are analysed to see whether they contain external links. If the nesting limit has been reached, go to step 7. Otherwise go to step 2 for each external link.

5) The email is now rebuilt by email rebuilder 50. In the case of MIME email, the external links are replaced with internal links, and the objects obtained are added to the email as MIME sections. Non-MIME email is first converted to MIME email, and the process then continues as before.

6) The email is sent on, and processing stops in respect of that email.

7) An undesirable object has been found, or the object could not be retrieved, or the nesting limit has been reached. We may wish to block the email (processing stops), or to remove the links. We may also want to send warning messages to sender and recipient if the email has been blocked. Meanwhile the email may be held in quarantine as indicated at 60, which may be implemented as a reserved file directory.

EXAMPLE

The following email contains a link to a website.

---

Subject: email with link
Subject:
Date: Thu, 9 May 2002 16:17:01 +0600
MIME-Version: 1.0
Content-Type: text/html;
Content-Transfer-Encoding: 7bit
<!DOCTYPE HTML PUBLIC "-//W3C//DTD HTML 4.0 Transitional//EN">
<HTML><HEAD>
</HEAD>
<BODY bgColor = 3D#ffffff> .
<DIV>  </DIV>
This is some text<BR>
<DIV><IMAGE src="http://www.messagelabs.com/images/global/nav/box-images/virus-eye-light.gif" >
</DIV>
This is some more text<BR>
</BODY></HTML>

---

The binary content of "http://www.messagelabs.com/images/global/nav/box-images/virus-eye-light.gif" is as follows:

```
00000000 47 49 46 38 39 61 17 00 17 00 C4 00 00 80 80 80   GIF89a....Ä..€€€
00000010 64 56 04 00 00 00 52 52 53 C8 AB 04 FD FD FD FF   dV....RRSÈ«.ýýýÿ
00000020 D8 00 AA 90 04 FF CE 00 0B 21 57 34 2B 03 C6 C6   Ø.ª .ÿÎ..!W4+.ÆÆ
00000030 C7 B0 AE AB 89 76 05 16 15 17 18 14 02 26 27 2C   Ç°®«‰v.......&',
00000040 C6 B1 4C BD BE C3 EF CB 03 24 10 02 03 0B 1E 00   Æ±L½¾ÃïË.$.....
00000050 2A 84 47 3C 03 0C 0A 05 93 8D 72 A1 9F 97 E2 E1   *„G<...." r¡Ÿ—âá
00000060 E1 DB E1 F6 D8 BA 03 FF ED 01 E4 BE 1E 21 F9 04   áÛáöØº.ÿí.ä¾.!ù.
00000070 00 00 00 00 00 2C 00 00 00 00 17 00 17 00 00 05   .....,..........
00000080 F6 20 20 8E 64 69 8E 48 AA AE EA 64 20 EF 8B 88   ö  ŽdiŽHª®êd ï‹ˆ
00000090 EC FA 12 4D 73 74 04 FF D2 35 C3 A4 73 08 3C 14   ì ú.Mst.ÿÒ5Ã¤s.<.
000000A0 8A 62 AE 07 5C 0D 3B 48 8C 40 F0 B8 20 1B 81 43   Šb®.\.;HŒ@ð¸ . C
000000B0 33 65 20 5C 1A D3 B0 98 72 09 88 0C E8 57 E7 22   3e \.Ó°˜r.ˆ.èWç"
```

-continued

```
000000C0 6E 87 A5 A2 03 D6 FA 70 DB A7 22 E9 5D E0 D0 B7    n‡¥¢.ÖúpÛ§"é]àÐ.
000000D0 1F 71 0F 01 14 6F 03 19 0B 1A 0E 53 7A 49 1D 22    .q...o.....SzI."
000000E0 01 01 60 7C 00 12 05 05 12 03 03 02 09 03 00 18    ..`|............
000000F0 14 01 04 8F 1D 75 10 0B 96 96 03 10 9A 16 09 1B    ...□.u.--..š...
00000100 9A 02 17 22 13 60 18 A7 A8 05 B0 15 AD 0C 10 53    š.."` .§¨.°.-..S
00000110 80 00 13 84 03 B8 96 0C 0E 09 16 16 15 0E 82 65    €.„.,-........,e
00000120 71 53 19 C5 96 0B 03 15 BF 07 1E 43 22 6C 02 0C    qS.Å-...¿..C"1..
00000130 38 1B 12 19 AA 02 18 01 1D 32 06 22 C3 0B 00 99    ....ª....2."Ã..™
00000140 10 7D 9F 65 04 68 2B 71 C4 19 90 90 3A 04 2E F5    .}Ÿe.h+qÄ.□□:..õ
00000150 2C 67 22 70 88 90 A6 60 0D 7B 00 10 7C D8 10 E1    ,g"p□¦  .{..}Ø.á
00000160 A0 C3 14 34 3E 14 D0 80 EE 61 8D 88 97 02 C8 B0    A.4>.Ð€îa□^-.E °
00000170 A8 E2 84 C7 5F 21 00 00 3B                         ¨â„Ç□!..;
```

This file can be downloaded, scanned, and if acceptable, a new email can be created with the image embedded in the email:

---

Subject: email with link
Subject:
Date: Thu, 9 May 2002 16:17:01 +0600
MIME-Version: 1.0
Content-Type: multipart/related;
    boundary="ABCD";
Content-Transfer-Encoding: 7bit
--ABCD
Content-Type: text/html;
Content-Transfer-Encoding: 7bit
</DOCTYPE HTML PUBLIC "-//W3C//DTD HTML 4.0 Transitional//EN">
<HTML><HEAD>
</HEAD>
<BODY bgColor=3D#ffffff>
<DIV>  </DIV>
This is some text<BR>
<DIV><IMAGE src=cid: EXTERNAL>
</DIV>
This is some more text<BR>
</BODY></HTML>
--ABCD
Content-ID: <EXTERNAL>
Content-Type: image/gif;
    name="image001.gif"
Content-Transfer-Encoding: base64
Content-Disposition: attachment;
    filename="image001.gif"
R01GOD1hFwAXZMQAAICAgGRWBAAAAFJSU8irBP39/f/YAKqQBP/OAAshVzQrA8bGx7Cuq412BRYV
FxgUAiYnLMaxTL2+w+/LAyQdAgMLHgAqhEc8AwwKBZONcqGfl+Lh4dvh9ti6A//tAeS+HiH5BAAA
AAAALAAAAAAXABcAAAX2ICCOZGmOSKqu6mQg74uI7PoSTXN0BP/SNcOkcwg8FIpirgdcDTtIjEDw
uCAbgUMzZSBcGtOwmHIJiAzoV+ciboelogPW+nDbpyLpXeDQtx9xDwEUbwMZCxoOU3pJHSIBAWB8
ABIEBRIDAwIJAwAYFAEEjx11EAuWIgMQmhYJG5oCFyITYBinqAWwFa0MEFOAABOEA7iWDA4JFhYV
DoJlcVMxZYLAxW/Bx5DImwCDLgbEhmqAhgBHTIGIsMLAJkQfZ91BGfrccQZkJA6BC71LGcicIiQ
pmANewAQfNgQ4aDDFDQ+FNCA7mGNiJcCyLCo4oTHjyEAADs=
--ABCD--

---

I claim:

1. A content scanning computer system for electronic documents such as emails comprising:
   a) a link analyser for identifying hyperlinks in content of a document;
   b) means for causing a content scanner to scan objects referenced by the hyperlinks identified by the link analyser and to determine whether or not the content of the document is acceptable according to predefined rules, the means being operative, when an identified hyperlink is to an object external to the document and is determined by the content analyser to be acceptable, to retrieve the external object and modify the document by b1. embedding in the document or attaching to the document the retrieved copy of the external object; and b2. replacing the identified hyperlink to the external object by a hyperlink to the copy of the external document embedded in, or attached to, the document.

2. A system according to claim 1, wherein the link analyser a) and means b) are operative to recursively process hyperlinks identified in external objects.

3. A system according to claim 2, wherein only a maximum depth of recursion is permitted and the document is flagged as unacceptable if that limit is reached.

4. A system according to claim 1, wherein acceptable retrieved copies of objects embedded in, or attached to, the document are encoded into MIME format.

5. A system according to claim 1, wherein, if content of any linked-to object is determined by the content scanner to be unacceptable, the document is flagged or modified to indicate that fact.

6. A method of content-scanning electronic documents such as emails comprising:

a) using a link analyser for identifying hyperlinks in the content of a document;

b) using a content scanner to scan objects referenced by hyperlinks identified by the link analyser and to determine whether or not the content of the document is acceptable according to predefined rules, and, when an identified hyperlink is to an object external to the document and is determined by the content analyser to be acceptable, retrieving the external object and modifying the document by:

b1. embedding in the document or attaching to the document the retrieved copy of the external object; and b2. replacing the identified hyperlink to the external object by a hyperlink to the copy of the external object embedded in, or attached to, the document.

7. A method according to claim 6, wherein the steps a) and b) are used recursively to process hyperlink identified in external objects.

8. A method according to claim 7, wherein only a maximum depth of recursion is permitted and the document is flagged as unacceptable if that limit is reached.

9. A system according to claim 6, wherein acceptable retrieved copies of objects embedded in, or attached to, the document are encoded into MIME format.

10. A method according to claim 6, wherein, if content of any linked-to object is determined by the content scanner to be unacceptable, the document is flagged or modified to indicate that fact.

11. A computer readable medium having stored thereon instructions for causing a computer to carry out a method for content-scanning electronic documents such as emails, the method comprising:

using a link analyser to identify hyperlinks in the content of a document;

using a content scanner to scan objects referenced by hyperlinks identified by the link analyser and determining whether or not the content of the document is acceptable according to defined rules, and, when an identified hyperlink is to an object external to the document and is determined by the content analyser to be acceptable, retrieving the external object and modifying the document by (i) embedding in the document or attaching to the document the retrieved copy of the external object; and (ii) replacing the identified hyperlink to the external object by a hyperlink to the copy of the external object embedded in, or attached to, the document.

12. A computer-readable medium according to claim 11, wherein the method further comprises recursively processing hyperlinks identified in external objects.

13. A computer-readable medium according to claim 12, wherein only a maximum depth of recursion is permitted and the document is flagged as unacceptable if that limit is reached.

14. A computer-readable medium according to claim 11, wherein acceptable retrieved copies of objects embedded in, or attached to, the document are encoded into MIME format.

15. A computer-readable medium according to claim 11, wherein, if content of any linked-to object is determined by the content scanner to be unacceptable, the document is flagged or modified to indicate that fact.

16. A system comprising a computer-readable medium according to claim 11.

* * * * *